Nov. 25, 1969   J. C. McMULLEN ET AL   3,480,395
METHOD OF PREPARING EXTRUDED GRAINS OF SILICON CARBIDE
Filed Dec. 5, 1967   2 Sheets-Sheet 1

FIG. I

INVENTORS
JOHN C. McMULLEN
KENNETH M. TAYLOR

INVENTORS
JOHN C. McMULLEN
KENNETH M. TAYLOR

United States Patent Office 3,480,395
Patented Nov. 25, 1969

3,480,395
METHOD OF PREPARING EXTRUDED GRAINS OF SILICON CARBIDE
John C. McMullen, Niagara Falls, N.Y., and Kenneth M. Taylor, Maitland, Fla., assignors to The Carborundum Company, Niagara Falls, N.Y., a corporation of Delaware
Filed Dec. 5, 1967, Ser. No. 688,175
Int. Cl. C01b 31/36
U.S. Cl. 23—208      10 Claims

ABSTRACT OF THE DISCLOSURE

A process for producing dense siliconized, silicon carbide abrasive grain which consists of forming an extrudable mix of finely divided silicon carbide, carbon and a suitable temporary binder. The mix is extruded into grains of desired shape and size having a length to diameter ratio of about 2:1. The extruded grains are fed at a controlled rate through a reaction zone maintained at a temperature of between 1800° C. and 2200° C. and having a non-oxidizing atmosphere. Silicon particles are also fed to the reaction zone to provide a source of silicon vapor. The reaction zone is rocked about its longitudinal axis so that the grains are continuously agitated to prevent sintering together of the individual grains as they move through the reaction zone and are siliconized.

---

This invention relates to a process for the production of dense silicon carbide abrasive grain and more particularly to a process for making dense silicon carbide abrasive grain of desired size and shape.

Silicon carbide abrasive grain is normally produced by charging an electric resistance furnace with a source of silicon, carbon, sawdust and salt and subjecting the mix to high temperatures to react the silicon of the mix with carbon to form silicon carbide.

After cooling, the furnace contents consist of a core comprising a central zone of graphite surrounded by crystalline silicon carbide, an intermediate layer of amorphous silicon carbide and an outer layer of unreacted material. The core of crystalline silicon carbide, which will be referred to as the ingot, is separated from the amorphous silicon carbide and unreacted materials and the ingot is crushed to produce abrasive grain.

Abrasive grain ranges in grade from coarse to fine, with the coarse particles, generally from 10 mesh to about 30 mesh, being used in grinding wheels designed for heavy-duty operations where considerable amount of material is to be removed from the workpiece. During crushing of the ingot to form ordinary silicon carbide grain, a substantial amount of finely divided abrasive material, known as fines, is produced along with the coarser abrasive grains. For example, when producing size 12 abrasive grain, that is abrasive grain having an average particle size of 12 mesh or about 1.7 mm., it is estimated that only about 20% of the ingot is recovered as 12 grit grain. Thus it can be seen that in producing abrasive grain, particularly the larger sizes, there is a considerable amount of offsize abrasive material produced which in many cases is an undesirable by-product.

Accordingly, it is an object of this invention to provide a process for the production of silicon carbide abrasive grain of controlled particle size, particularly abrasive grains of coarser size.

It is a further object of this invention to provide a process for the production of silicon carbide abrasive grain of desired size utilizing finely divided silicon carbide.

Another object of this invention is to provide silicon carbide abrasive grain having increased toughness as compared to ordinary crushed silicon carbide grain.

Another object of this invention is to provide a continuous method for the production of silicon carbide abrasive grain.

Another object of this invention is to provide a method for producing improved silicon abrasive grain.

These and other objects and advantages of this invention will become apparent upon consideration of the following detailed description and accompanying drawings wherein.

Figure 1:
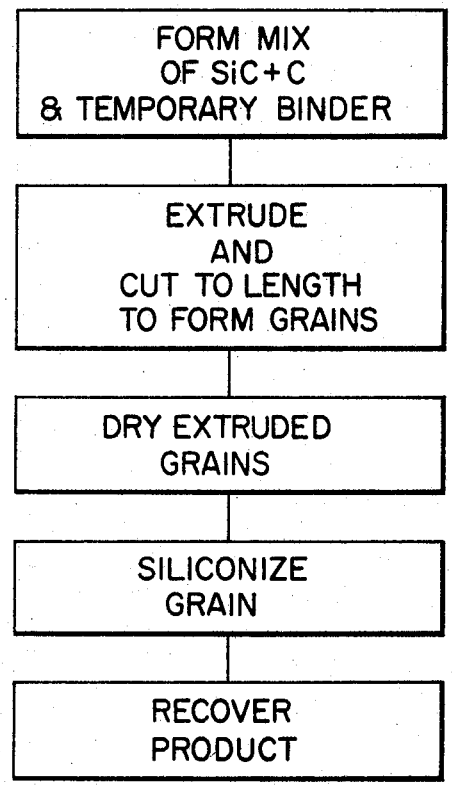
FIG. 1 is a flow diagram illustrating schematically the method for producing the novel abrasive grain according to this invention.

Referring to FIG. 1, the inventive method comprises five basic steps, namely: (1) forming a wet mix of finely divided silicon carbide and carbon plus a temporary binder; (2) extruding or otherwise forming the mix into grains of desired cross section and length; (3) drying the grains to set the temporary binder to provide sufficient green strength for the grains to allow for the further processing of said grains; (4) moving the grains continuously through a reaction zone of desired temperature in the presence of silicon to cause a reaction between the silicon and the carbon in the grains to form silicon carbide in situ; and (5) recovering the silicon carbide abrasive grains.

More specifically, the source of silicon carbide is preferably finely divided silicon carbide produced during the crushing of silicon carbide ingots. This source is preferred because finely divided silicon carbide is normally an undesired by-product of the formation of coarse crushed silicon carbide abrasive grain and thus represents an economical source of silicon carbide for the production of abrasive grain according to this invention. It is preferred that the silicon carbide be No. 1 grade, that is having a silicon carbide content of at least 97%, in order to produce No. 1 grade abrasive grains according to this invention. However, in cases where lower grade abrasive grain may be desired, the silicon carbide may be of lesser purity.

The carbon may be derived from any of the commonly used carbon sources such as, for example, finely divided graphite or petroleum coke. In addition, at least some of the carbon may be produced by a suitable temporary binder which carbonizes upon heating to provide free carbon for reaction with silicon.

In forming a mix according to this invention, it is necessary to provide sufficient carbon so that in the subsequent siliconizing operation sufficient silicon carbide will be formed to bond the silicon carbide particles of the mix and to substantially completely fill the pores of the grain. Insufficient carbon in the mix results in a finished grain that has insufficient hardness, strength and density due to a high proportion of free silicon in the pores of the grain. Too much carbon tends to block the pores of the extruded grains, thus preventing sufficient penetration of the grains by silicon during the siliconizing operation.

In addition to the foregoing considerations, it has been found when the proportions of carbon in the mix are too high, that the grains extruded therefrom have insufficient strength for further processing in accordance with this invention. Accordingly, the proportion of carbon present in the mix should range from about 3% to about 30% by dry weight of the mix. It is preferred, however, that the carbon comprise about 19% to about 25% by weight of the mix.

The remainder of the mix consists of finely divided silicon carbide having a particle size less than about 23 microns and preferably an average particle size on the order of 7 microns and a suitable temporary binder. The silicon carbide is present in proportions ranging from about 67% to about 94% by dry weight of the mix.

The term temporary binder is used to refer to those materials added to the mix which aid bonding the particles together subsequent to extruding and prior to siliconizing. As is well-known, temporary binders may also aid in improving the extruding properties of the mix and the selection of a particular temporary binder is largely dependent on the type of extruding equipment available and on the vehicle added to the dry mix to make it sufficiently wet or fluid for extrusion. In the examples set forth below, water was added to fluidize the dry mix and the temporary binder selected was starch and water soluble methyl cellulose. However, dextrine or starch alone may also be used as a temporary binder. In other cases where an organic vehicle such as pine oil is used to fluidize the mix, synthetic resins such as the condensation products of the aldehydes and phenols may be used.

The proportions of temporary binder used in the mix may be widely varied depending on the amount of handling the extruded bodies are to be subjected to prior to siliconizing. In the examples the temporary binder constitutes about 3% to about 5% by dry weight of the mix, although this percentage may be increased if greater green strength is desired.

According to the preferred practice of this invention, silicon carbide, carbon and temporary binder are thoroughly mixed by tumbling, mulling or otherwise blending the ingredients. Sufficient water is added to the dry mix to fluidize the mix for extrusion. The mix is extruded into strands of desired cross section using conventional extrusion equipment. The extruded strands are cut or broken into grains of desired length, it being preferred that the length to diameter ratio of the grains be on the order of 2:1. The grains are cured to set up the temporary binder and to drive off excess moisture.

After curing the grains are moved continuously through a high temperature reaction zone in the presence of elemental silicon where the silicon reacts with the carbon of the grains to form silicon carbide. The temperature of the reaction zone is maintained above about 1800° C. and below the decomposition temperature of silicon carbide, about 2200° C. The atmosphere in the reaction zone is non-oxidizing.

In practicing this invention the grains may be moved continuously through a conventional tube furnace such as by pushing a boat containing the grains through the furnace at controlled rate or by using a rotary kiln. For best results, however, we prefer to use a rocking tube furnace of the type described in John C. McMullen's application Ser. No. 623,661 filed Mar. 16, 1967 entitled Rocking Electric Tube Furnace, now Patent No. 3,415,940.

A rocking tube furnace comprises a furnace having a resistance tube heater, means for tilting the resistance tube downwardly toward the discharge end thereof and means for rocking the resistance tube about its longitudinal axis. Using such a furnace, granular material can be continuously moved through the reaction zone at a controlled rate, the rate of movement being largely controlled by the degree of downward tilt of the resistance tube. In addition, the rocking motion of the furnace largely prevents the sintering together of the individual grains due to the agitation of the grains as they move through the reactor zone of the furnace.

Elemental silicon may be fed into the inlet end of the furnace along with the extruded grains or, preferably, it is fed directly to the reaction zone through an opening into the reaction zone provided for that purpose. Best results have been achieved when the elemental silicon is introduced to the reaction zone in relatively large pieces (−6+10 mesh) or in the form of pressed slugs. It has been found in the particular apparatus used that excellent grain can be produced using silicon powder but that the finely divided silicon tends to plug up in the inlet tube leading to the reaction zone, making it necessary to shut the furnace down several times during a run to unplug the silicon inlet tube. This problem can undoubtedly be overcome by cooling or insulating the inlet tube adjacent the reaction zone so as to prevent the fine silicon powder from volatilizing or sintering prior to entering the reaction zone.

Figure 2:
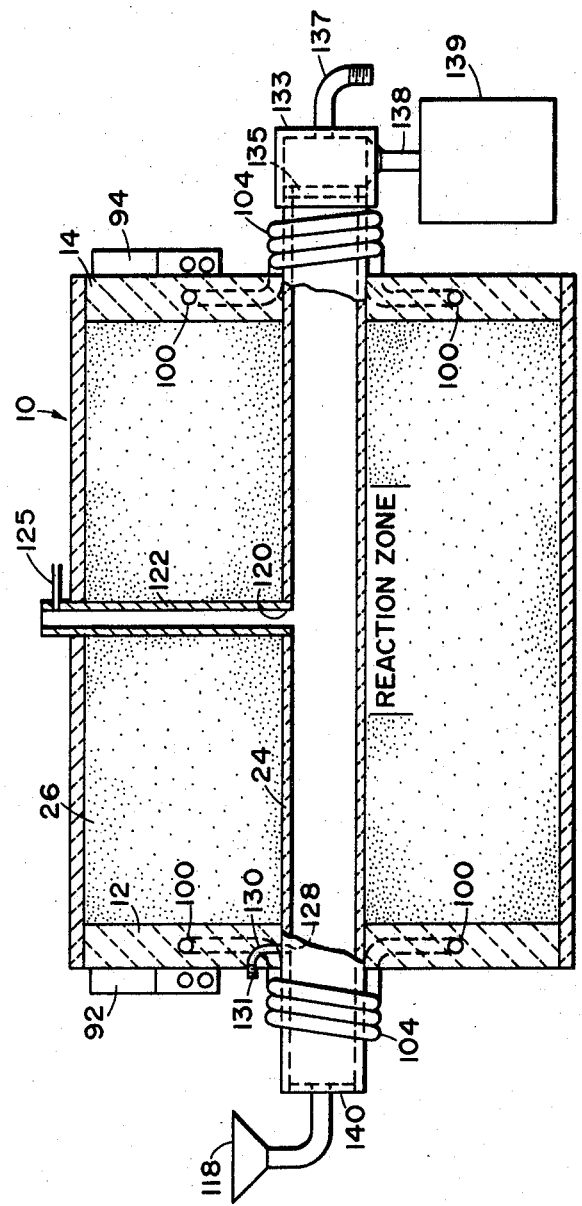
FIG. 2 is a side sectional view of a rocking furnace with rocking and tilting means not shown.

Referring to FIG. 2 there is shown a longitudinal section of a rocking furnace which can be used to produce abrasive grain according to this invention. The tilting and rocking means are not shown, but are described in detail in the aforementioned application by John C. McMullen. Casing 10 is provided with forward end slab 12 and a rear end slab 14, preferably formed of graphite. Slabs 12 and 14 are provided with circular openings for receiving and supporting an elongated hollow resistance tube 24, preferably made of graphite, which protrudes beyond said front and rear end slabs.

The interior space 26 of casing 10 surrounding resistance tube 24 is filled with a suitable insulating material, such as carbon black, which serves as a thermal insulator and which also prevents oxidation of the exterior surface of tube 24.

A gas-tight metallic cover 133 is mounted over the discharge end of tube 24. A graphite ring 135 is provided within cover 133 in abutting relationship with the end of resistance tube 24 and acts as a bearing against which the end of tube 24 may rock relative thereto. A non-oxidizing gas is introduced into tube 24 through inlet 137 which is secured into the end wall of cover 133 and which is provided with a threaded end portion for accommodating connections for conduits which deliver selected non-oxidizing gas to the tube from a suitable source (not shown). A funnel spout 138 is provided in the bottom of cover 133 for permitting discharge of the finished product into a suitable gas-tight receptacle 139.

Means are provided for delivering material through funnel 118 into the inlet end of tube 24. A seal 140 is disposed about funnel 118 to preclude ambient air from entering tube 24 and to permit the non-oxidizing gas in tube 24 to bleed through. Such a seal may be a porous graphite ring or alternatively, a suitable burner ring.

An aperture 120 is provided in the resistance tube approximately midway between the ends thereof to accommodate tube 122. In preferred operations, silicon is fed directly to the reaction zone through tube 122. Tube 122 is provided with an opening for accommodating tube 125 for the introduction of non-oxidizing gas into tube 122.

The graphite front and rear slabs 12 and 14, respectively, act as conductors and make electrical contact adjacent the inlet discharge ends of tube 24 for the purpose of heating the same. A pair of water cooled terminal blocks 92 and 94 are suitably mechanically and electrically connected to graphite slabs 12 and 14, respectively. Flexible insulated conductor cables (not shown) carry electrical current to terminal blocks 92 and 94.

The resistance tube 24 includes a substantially central heating section on reaction zone portion and cold ends adjacent slabs 12 and 14. In order to maintain the cold ends of tube 24, means are provided for cooling the end slabs 12, 14, terminal blocks 92, 94 and the ends of tube 24 adjacent graphite slabs 12 and 14. Since the same means for cooling are provided on both the inlet and discharge ends of tube 24, it is believed a detailed description of the means on the discharge end of tube 24 will suffice. Such means comprise a conduit 100 leading from a suitable source (not shown) of coolant, such as water for example, by means of a flexible hose (not shown), said conduit passing through terminal block 94. After leaving terminal block 94, conduit 100 is directed horizontally through slab 14 in a direction normal to the longitudinal axis of tube 24, then along the front of slab 14 and wrapped about the periphery of tube 24 as at 104, then back through the bottom portion of slab 14 in a reverse direction and back to the source through a suitable flexible hose (not shown).

In operation, the furnace is tilted at the desired angle of inclination in accordance with the amount of time it is desired to have the grains in contact with the reaction zone. This time can be varied from 1 minute to 8 or more minutes and is largely dependent on the size and shape of the grains and reaction zone temperature, it being understood that with a low reaction zone temperature (1800° C.) and/or with large grain size, the time in the reaction zone will be longer than when the reaction zone temperature is higher or the grain size is small. The primary requirement is that the grain remain in the reaction zone exposed to silicon for a sufficiently long period for the carbon in the grain to react with the silicon to form silicon carbide.

Electric current is passed through tube 24 and the ends thereof are cooled in the manner described above. This results in the center portion of tube 24 being at a higher temperature than the ends. This center portion is the reaction zone and it is maintained at a selected temperature between about 1800° C. and about 2200° C. It is preferred to maintain the reaction zone at a temperature of about 2100° C. A non-oxidizing or inert gas is passed through tube 24 in the manner described above.

The furnace is oscillated or rocked by means described in the aforementioned application and the extruded and cured grains are continuously fed into the inlet end of tube 24. Silicon is fed directly to the reaction zone through tube 122 where it is melted. In the siliconizing step, the grains are continuously agitated and passed through the reaction zone where they are heated in the presence of silicon whereby the silicon penetrates the grains and reacts with the carbon thereof to form silicon carbide in situ.

The siliconized grains pass from the reaction zone to the cooler discharge end of tube 24 and are collected in a suitable container. It is to be recognized that some grains may be unsiliconized or only partially siliconized in the reaction zone, and therefore the product from the furnace is subjected to a ball milling operation to pulverize the unsiliconized or partially siliconized grains, which powder is then washed away from the reacted grains.

The specific examples set forth below serve to further illustrate the manner in which the present invention is practiced.

Example I

The following procedure has been used to produce cylindrically shaped silicon carbide abrasive grain for use in abrasive articles.

Wt. percent of Mix
Silicon carbide, 1200 grit _____ 78.0
Finely divided graphite _____ 19.0
Temporary binder, 2 parts powdered methyl cellulose, 1 part starch _____ 3.0

The above ingredients were mixed together and 2060 grams of the mix was blended with about 750 grams of water to form an extrudable mass.

The above extrudable mass was introduced into an auger-type extruder from which the material was extruded into rods through a die having circular opening of 0.0630 inch. The extruded rods were broken in lengths of about 0.12 inch and the cylindrical grains thus formed were oven dried and cured overnight at a temperature of about 100° C. The grains thus formed are referred to as size 12 and have a cross-sectional area equivalent to 12 grit abrasive grain.

Approximately 1400 grams of the dried and cured grains were fed through a rocking tube furnace of the type described above for siliconizing. The grains were fed into the furnace at the rate of 25 gm./min. and the furnace was tilted about 5° from horizontal. Silicon metal having a particle size of between about 2 mm. and about 4 mm. was fed directly to the reaction zone of the furnace at a rate of 15 gm./min. The reaction zone of the furnace was maintained at a temperature of about 2100° C. and argon was used to maintain an inert atmosphere in the furnace. The individual grains were in contact with the reaction zone for about 2 minutes. Due to the rocking motion and tilt of the furnace, the grains were continuously agitated as they passed through the furnace. The time required to siliconize the 1400 grams was about 60 minutes.

The siliconized grains were collected in a gas-tight container for cooling. After cooling the grains were ball milled for about 15 minutes, using alumina balls, to break up any unsiliconized and unreacted grains and upon completion of the ball milling operation, the grains were water washed to separate the unsiliconized and unreacted portions from the finished product.

The finished grains had a density of about 88% of the theoretical density of silicon carbide and were substantially tougher, having a friability index of 25.4, than 12 grit ordinary crushed silicon carbide grain of equivalent grade, said ordinary crushed grain having a friability index of 42.2.

Friability index, as used herein, is a measure of grain toughness and is determined by ball milling for 10 minutes 100 grams of material having a particle size such that it is passed through a 12 mesh screen and is retained on a 14 mesh screen (all screen sizes are United States Sieve Series). At the completion of ball milling, the material is carefully rescreened and the weight of material which passes a 16 mesh screen is recorded. This weight, divided by the original weight of the material before screening, multiplied by 100, is reported as the friability index. The lower the friability index the tougher the grain.

Example II

To determine the preferred amounts of carbon and silicon carbide to be used in making abrasive grains according to this invention, a series of mixes was produced having varying amounts of carbon and silicon carbide.

The carbon varied from about 5% to about 40% of the mix while the silicon carbide ranged from about 91% to about 56%. The temporary binder was maintained in all mixes at about 4%. Listed below are the various mixes.

|  | Wt. Percent of Mix | | | | |
| --- | --- | --- | --- | --- | --- |
|  | Mix 1 | Mix 2 | Mix 3 | Mix 4 | Mix 5 |
| Silicon carbide | 91 | 86 | 78 | 68 | 56 |
| Carbon | 5 | 10 | 18 | 28 | 40 |
| Temporary binder, 2 parts methyl cellulose, 1 part starch | 4 | 4 | 4 | 4 | 4 |

Water was added to each of the above mixes to form extrudable masses therefrom and each was extruded into rods having a diameter of 0.375 inch and a length of about 1 to 2 inches. After extrusion the rods were dried at 180° C. overnight and then fired at sufficiently high temperature to carbonize the temporary binder. The specific gravities of unsiliconized rods sampled from each mix were determined after drying and after firing. The results are set forth below.

| | Calculated Theor. Density (SiC=3.17, C=2.25) | Dried Rods | | Fired Rods | |
|---|---|---|---|---|---|
| | | App. Sp. Gr. | Percent of Theor. | App. Sp. Gr. | Percent of Theory |
| Mix: | | | | | |
| 1 | 3.1235 | 1.54 | 49.3 | 1.431 | 45.8 |
| 2 | 3.078 | 1.461 | 47.5 | 1.347 | 43.8 |
| 3 | 2.986 | 1.459 | 48.9 | 1.286 | 43.1 |
| 4 | 2.894 | 1.355 | 46.8 | 1.271 | 43.9 |
| 5 | 2.812 | 1.255 | 43.7 | | |

Mix 3 was noted to be the mix that extruded best. Rods extruded from mix 5 had insufficient green strength after firing to permit the determination of specific gravity.

Example III

An extrudable mass having the composition of mix 3 in Example II was extruded into size 12 grains (0.063 dia. and length of about 0.125) and dried as in Example II. Batches of the extruded grains were siliconized and reacted in a rocking furnace varying certain furnacing conditions, such as for example, rate of feed and reaction zone temperature, in order to determine the preferred conditions for siliconizing and reacting abrasive grains according to this invention. After furnacing the grains were ball milled and washed as in Example I and the finished grains weighed. This weight, when divided by the weight of the extruded grains fed into the furnace and multiplied by 100, is reported as the percent recovery. The results are set forth in Table A below. Unless otherwise noted, furnacing conditions were the same as in Example I.

As can be seen from Table A, run No. 15 gave the best results insofar as process efficiency, as measured by product recovery, is concerned.

grain can substantially affect the abrasive qualities thereof.

Although specific feed rates for the grains and silicon through the siliconizing furnace have been stated and certain preferred rates are specified in the examples, it should be clear that these rates are preferred for the furnace described above. For different furnaces the feed rates will vary depending on the size and type of furnace as well as the reaction zone temperature and atmosphere and the particular feed rates used can be readily determined by pilot runs through the particular furnace selected for siliconizing. It is essential only that the feed rate be such as to allow sufficient time to allow for the siliconizing of the grains and the reaction of the silicon with the free carbon in the grains to form silicon carbide.

Abrasive grains made according to this invention are incorporated in bonded abrasive articles, such as, for example, grinding wheels, using the same bonding agents and techniques used in producing bonded abrasive articles using ordinary crushed silicon carbide abrasive grains. The bonded articles incorporating abrasive grains made according to this invention are normally used in the same manner as those incorporating ordinary crushed silicon carbide abrasive grains.

We claim:

1. A method for producing improved dense silicon carbide abrasive grain of controlled size and shape which comprises the steps of forming grains of desired size and shape from a formable mix comprising finely divided silicon carbide, carbon and a temporary binder, maintaining a reaction zone at a temperature above 1800° C. and below the decomposition temperature of silicon carbide, said reaction zone having a non-oxidizing atmosphere, feeding silicon and said grains to said reaction zone at a controlled rate and continuously moving said

TABLE A

| | Total Wt. Extruded Grains, gms. | Reaction Zone Temp., °C. | Rate of Feed, gms./min. | | Si Mesh Size (U.S. Sieve Series) | Percent Recovery | Remarks |
|---|---|---|---|---|---|---|---|
| | | | Extruded Grains | Si | | | |
| Run No.: | | | | | | | |
| 10 | 1,850 | 1,800 | 25 | 10 | −12+16 | 16.4 | |
| 11 | 1,409 | 1,800 | 25 | 20 | −12+16 | 62.7 | Furnace plugged with Si. Unreacted Si with product. |
| 12 | 1,651 | 1,900 | 25 | 10 | −30+80 | 40.0 | Fine Si plugged inlet tube. |
| 13 | 1,642 | 2,000 | 25 | 10 | −12+16 | 14.6 | |
| 14 | 1,383 | 2,100 | 25 | 10 | −12+16 | 35.0 | |
| 15 | 1,409 | 2,100 | 25 | 15 | −4+6 | 73.7 | |
| 16 | 1,385 | 2,100 | 25 | 25 | −4+6 | 53.8 | Si plugged furnace, considerable unreacted Si. |
| 17 | 1,500 | 2,100 | 50 | 30 | −4+6 | 41.7 | Si plugged furnace. |
| 18 | 1,984 | 2,100 | 50 | 15 | −4+6 | 46.6 | |
| 19 | 3,600 | 2,100 | 50 | 15 | −6+10 | 35.5 | |
| 20 | 595 | 2,200 | 25 | 10 | −12+16 | 18.5 | |
| 21 | 793 | 2,200 | 25 | 20 | −12+16 | 37.0 | |

Comparative cross sections of grain made as in Example I and grain of the same composition but siliconized by the stationary positioning thereof in a conventional furnace have been prepared. Photomicrographs of these comparative cross sections show that the abrasive material made according to this invention has a structure consisting essentially of fine grained silicon carbide having some free silicon substantially uniformly distributed throughout the silicon carbide. Photomicrographs of the grain siliconized and reacted in a conventional furnace shows large crystals of silicon carbide in a matrix of silicon. The structure of abrasive grain made according to this invention is preferred for abrasive applications since such grain is harder and has more uniform abrasive characteristics.

Abrasive grain made according to this invention can be made to any size to correspond with the conventional grit sizes of ordinary crushed abrasive grain. In addition, the shape of the grain can be varied according to the particular abrasive purpose to which it is to be applied. This is a substantial improvement over conventional crushed grain since it is known that the shape of the grains through said reaction zone in the presence of silicon whereby said silicon enters said grains and reacts with said carbon contained therein to form silicon carbide, while said grains are moving, and cooling and collecting said silicon carbide abrasive grains.

2. The method of claim 1 wherein said reaction zone is inclined from its horizontal plane and is rocked about its longitudinal axis whereby said grains are agitated and continuously moved through said reaction zone.

3. The method of claim 1 wherein said formable mix comprises, on the dry weight basis, about 3% to about 30% finely divided carbon, about 67% to about 94% finely divided silicon carbide and about 3% to about 5% of temporary binder.

4. The method of claim 3 wherein said formable mix comprises about 19% to about 25% of finely divided carbon.

5. The method of claim 1 wherein said grains are formed by means of extruding said formable mix.

6. The method of claim 1 wherein said reaction zone is maintained at a temperature of 2100° C.

7. The method of claim 1 wherein said grains are fed to said reaction zone at a rate of about 25 gm./min. to about 50 gm./min.

8. The method of claim 1 wherein said silicon is fed to said reaction zone at a rate of between about 10 gm./min. and 30 gm./min.

9. The method of claim 1 wherein said silicon has a particle size greater than 12 mesh.

10. The method of claim 1 wherein said grains are fed to said reaction zone at a rate of about 25 gm./min. and said silicon is fed to said reaction zone at a rate of about 15 gm./min., said silicon having a particle size so as to pass through a 4 mesh sieve and be retained on a 6 mesh sieve.

References Cited

UNITED STATES PATENTS

| | | | |
|---|---|---|---|
| 2,178,773 | 11/1939 | Benner et al. | 23—208 |
| 2,938,807 | 5/1960 | Andersen | 106—44 |
| 3,205,043 | 9/1965 | Taylor | 23—208 |
| 3,275,722 | 9/1966 | Popper | 264—65 |
| 3,348,915 | 10/1967 | Watson et al. | 23—204 |
| 3,438,729 | 4/1969 | Ohlgren | 23—208 |

OSCAR R. VERTIZ, Primary Examiner

G. T. OZAKI; Assistant Examiner

U.S. Cl. X.R.

106—44; 264—57.